Dec. 30, 1924.

A. B. ERICKSON 1,521,285

TELEPHONE AND TELEGRAPH POLE

Filed Oct. 15, 1923

Inventor
A. B. Erickson
By Watson E. Coleman
Attorney

Patented Dec. 30, 1924.

1,521,285

UNITED STATES PATENT OFFICE.

AXEL B. ERICKSON, OF OMAHA, NEBRASKA.

TELEPHONE AND TELEGRAPH POLE.

Application filed October 15, 1923. Serial No. 668,714.

*To all whom it may concern:*

Be it known that I, AXEL B. ERICKSON, a citizen of the United States, residing at Omaha, in the county of Douglas and State of Nebraska, have invented certain new and useful Improvements in Telephone and Telegraph Poles, of which the following is a specification, reference being had to the accompanying drawings.

This invention relates to poles used in the building of telegraph, telephone and other lines and has for its object the provision of novel means for protecting the posts against rotting at the ground line and against being damaged by grass fires.

It is well known that after telephone, telegraph and other similar posts have been standing for awhile, sometimes only one or two seasons, the wood becomes rotten at the ground line so that the poles are easily blown down in stormy weather, this naturally resulting in a great loss to the companies concerned inasmuch as frequent replacement of the poles is absolutely necessary.

With the above facts in view, I have designed the present protected and reinforced pole which will obviate the above mentioned conditions and which will be a great money saver on account of the extreme durability.

With the above and other objects and advantages in view, the invention consists in the details of construction to be hereinafter more fully described and claimed, and illustrated in the accompanying drawings in which:—

Figure 1:
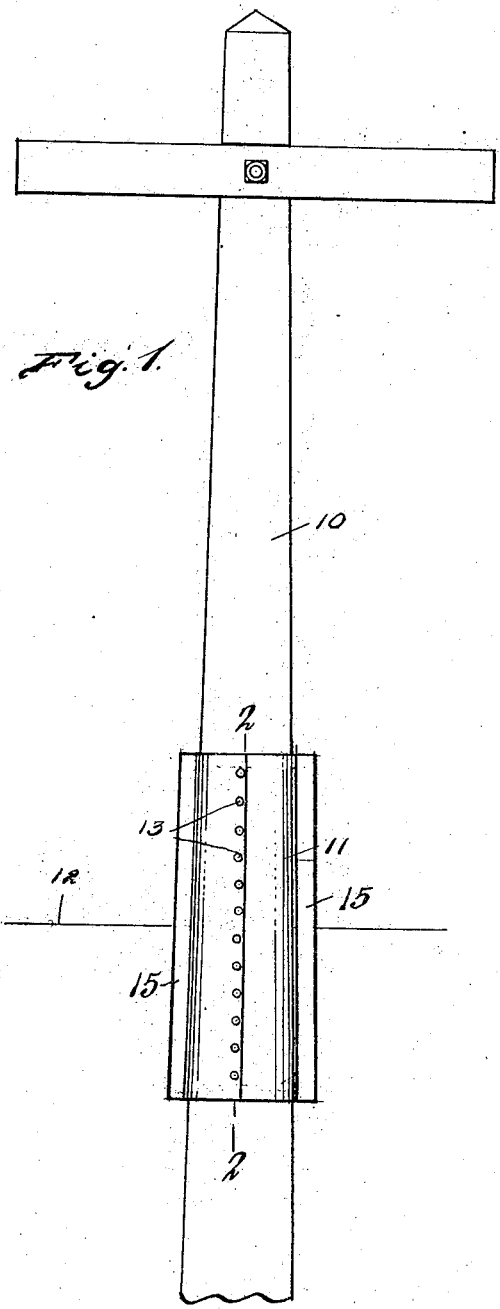
Figure 1 is a side elevation of a pole employing my invention.
Figure 2:
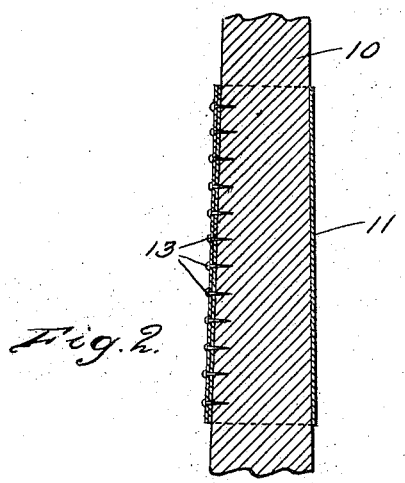
Figure 2 is a longitudinal section on the line 2—2 of Figure 1.
Figure 3:
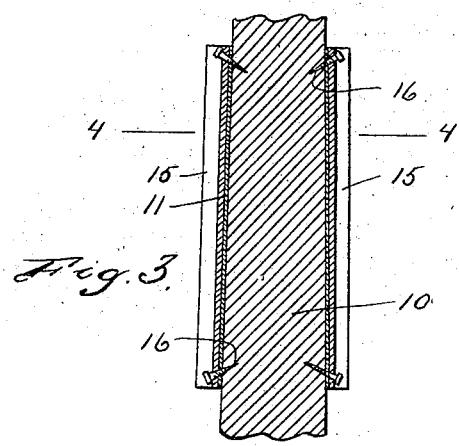
Figure 3 is a longitudinal section at right angles to Figure 2, the view being taken on the line 3—3 of Figure 4.
Figure 4:
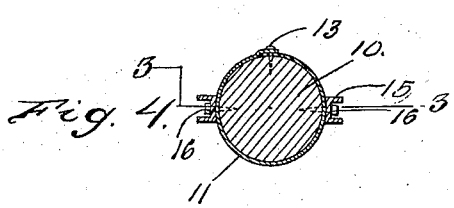
Figure 4 is a cross section on the line 4—4 of Figure 3.

Referring more particularly to the drawings, the numeral 10 designates the pole which is of the usual construction. In carrying out my invention I provide a covering 11 of sheet metal such as copper, aluminum or the like, the requirement being that the material be such that it will not corrode or rust under the influence of moisture. This covering is wrapped about the pole so as to extend beyond both sides of the intended ground line 12 so as to form an effectual shield against moisture. To secure the covering it is preferable to make use of penetrating members such as the nails illustrated at 13 which are driven through the overlapping edges of the shield and into the material of the post. The number of nails and the size thereof may be best determined from experimentation and these nails should likewise be of copper or other non-corrodible material.

To effect a bracing action, I provide two or more elongated brace bars 15 of iron or other material and preferably angular in cross section so as to have rigidity, which brace bars are secured to the pole by lag screws 16 or the like which are preferably inserted in such a way as to be converging.

In actual use, it is obvious that moisture cannot get access to the material or the pole at all near the ground line so that the wood will be kept dry and be prevented from rotting even though there should be an unusually wet spell. Furthermore, it is quite apparent that the pole will be effectually braced so as to withstand very high winds and also to withstand other strains such as result from the pole being struck by a wagon or other object, and such as the weight of sleet encrusted wires. Moreover, the sheet metal shield will act to prevent the pole from being charred or burned in case of grass fires such as frequently occur throughout the country. In every way the device is sure to be of distinct advantage in point of durability.

While I have shown and described the preferred embodiment of the invention, it is to be understood that I reserve the right to make such changes in the form, construction and arrangement of parts as will not depart from the spirit of the invention or the scope of the subjoined claim.

I claim:—

Protective means for a pole adapted to be driven into the ground, comprising a sheet metal sheathing engaged about the pole at a point to extend above and below the ground line, the edges of the sheathing being secured in overlapping relation, a plurality of elongated channel bars disposed against the sheathing and arranged to extend longitudinally of the pole, and securing elements passing through the ends of the channel bars and penetratingly engaging within the pole, said securing elements being inclined and converging toward the longitudinal axis of the pole.

In testimony whereof I hereunto affix my signature.

AXEL B. ERICKSON.